June 4, 1935.  A. E. HUGHES  2,003,749

FRUIT TESTING DEVICE

Filed Dec. 28, 1932  2 Sheets-Sheet 1

WITNESSES
George M. Bahrt
Geo. H. Sermon

Inventors
Ausker Edward Hughes

June 4, 1935.　　　A. E. HUGHES　　　2,003,749
FRUIT TESTING DEVICE
Filed Dec. 28, 1932　　2 Sheets-Sheet 2
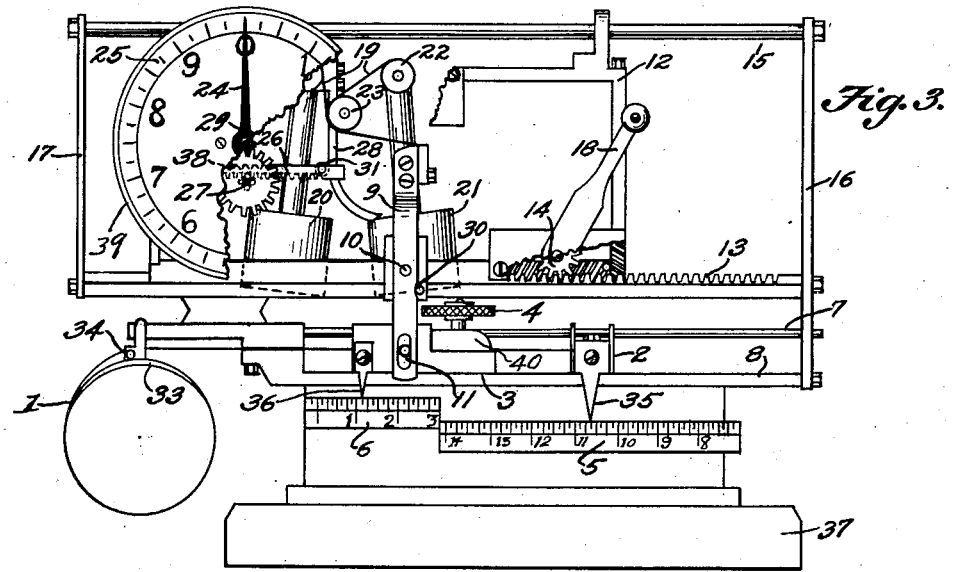
Inventor
Ausker Edward Hughes
WITNESSES
George M. Bahrt
George N. Servies Patented June 4, 1935

2,003,749

UNITED STATES PATENT OFFICE 2,003,749

FRUIT TESTING DEVICE

Ausker E. Hughes, Orlando, Fla., dedicated to the free use of the Public

Application December 28, 1932, Serial No. 649,186

5 Claims. (Cl. 265—17)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and used by or for the Government for governmental purposes without payment to me of any royalty thereon.

I hereby dedicate the invention herein described to the free use of the public, in the territory of the United States of America, to take effect upon the granting of a patent to me.

This invention relates to a device for applying external pressure to certain whole fruits (more particularly to citrus fruits) and for measuring the pressure or force required to rupture the fruit. The device also includes means for measuring the circumference of the fruit and the change in this dimension under the influence of the applied external pressure. More specifically, the invention herein illustrated and described is especially designed for testing the ability of fruit to withstand external pressure applied by means of a constricting flexible band completely surrounding the fruit, equatorially.

The shipping quality of a fruit is largely determined by its ability to withstand pressure, exerted from numerous directions, upon various points upon the surface of the fruit, while in the pack. This characteristic may be termed rigidity or ability to retain its original shape and is not determined by the texture of the rind alone. The internal structure plays an important role in determining this factor of quality. In a device for investigating the ability of citrus fruits to withstand pressures, it has been considered advisable to duplicate as closely as possible the actual conditions that take place in the pack. Various testing machines on the market and devices in general use for testing fruits and vegetables have been considered. Testing one point (a small area) at a time with a puncturing device is widely practiced in the fruit industry with creditable results, but an application of these methods to citrus fruits does not give comparable results. The method of testing giving promise of greatest utility, to which the herein described invention relates, is that of measuring the force or tension, which, when applied so as to cause contraction of a flexible metal band completely surrounding the fruit midway between the blossom and stem ends, will completely disrupt the fruit.

The principal object of this invention is, therefore, to provide dependable and relatively simple means for testing and determining the comparative ability of fruit to withstand external pressure applied to the fruit equatorially through the medium of a constricting flexible band. More specifically, it is the object of this invention to provide simple and operable means for applying and accurately measuring the force or pressure required to disrupt a specimen of fruit; the said force or pressure being applied to the fruit through tension on a constricting flexible band completely surrounding the fruit equatorially.

Another object of this invention is to provide simple means for accurately measuring the circumference of the fruit and the change in this dimension under the band while determining the force required to disrupt the fruit as above described.

Other objects of the invention are to provide simple and dependable means for exerting a steady, non-fluctuating, and accurately measurable force or pressure on the fruit being tested; and to accomplish this result without resorting to the use of coiled springs or any similar element, the force-transmitting mechanism of which is inherently subject to change and deterioration.

With the foregoing objects and other possible applications of this invention in view, my invention consists in certain novel features of construction and arrangement of parts, that will be hereinafter more fully described and illustrated, and claimed. One form of the invention is illustrated in the accompanying drawings, in which Figure 1 is a front elevational view of the machine as a whole, illustrating the arrangement therein, of such parts as the constricting band, a crank assembly for applying force, and dial and scales for measuring the force applied and the circumference of fruit under test;

Figure 3 is a front elevational view of the machine, with a part of the dial and frame members cut away to show the arrangement and operating parts of the force-transmitting system, and particularly of the "sensitive element";

Figure 4 is a detailed view of members of the force-transmitting system, illustrating the connection between the flexible band and the "sensitive element" and the operation of the latter;

Figure 1:
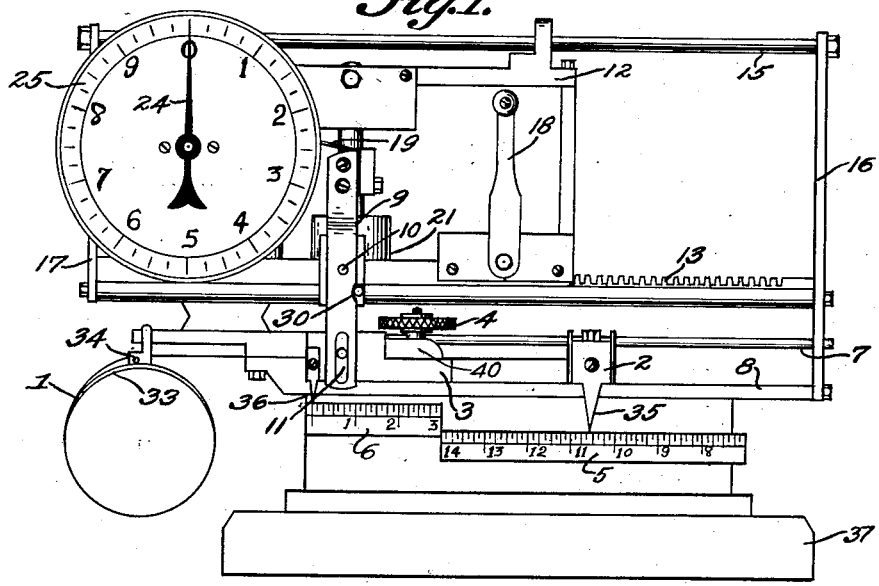

Figure 5 is a perspective view showing the arrangement of the sliding-clamp and adjustment-block members carrying the flexible band for encompassing the fruit, and the lever-arm member of the "sensitive element"; and Figure 6 is a larger-scale detailed view illustrating the arrangement of the cam-lever, cam-roller, and rack-and-pinion system by which motion of the "sensitive element" is transmitted to the dial indicator-hand.

Constructional features of the machine include a suitable base, supporting a rigid open framework, herein called the outer frame, essentially comprising longitudinal slideways, guide rods, and vertical supports; and a movable inner frame and other movable parts, hereinafter described.

Referring by numerals to the accompanying drawings, 1 designates a flexible band, preferably of steel, one end of which is securely fastened in a fixed position on the rigid, outer frame of the machine, from which the band extends downward forming a nearly circular loop or bight, thence circles upward back to the frame of the machine and after passing over a carrier-pulley 34 supported by a lug on the said frame, continues through a slot in the said lug and through the open outer frame in a generally horizontal line to the right (viewed from the front), the other end of this band being attached to a sliding adjustment block-member 2. A thin, curved guard-piece, 33, also somewhat flexible, serves as a guide for the band, 1, and aids in distributing compressive force applied to fruit in the loop of band 1. Between the loop and member 2, the flexible band, 1, passes over a sliding clamp-block-member 3, capable of being moved to right or left in a horizontal plane, and the flexible band 1 may be firmly clamped to the said member 3 by means of the clamp screw 4, which serves to actuate clamp-jaw 40, or bind it to block 3.

Each of the sliding block-members 2 and 3 carries a pointer, 35, 36, and these pointers in association with the graduated scales 5 and 6, respectively, serve to indicate the relative position of their particular blocks, thereby providing means for measuring, respectively, the circumference of the fruit being tested, and the change in the circumference under the band, as the fruit is subjected to pressure. Both the adjustment-block 2, and the clamp-member 3, follow along a guide-rod 7 and slideway 8 the said guide-rod 7 and slideway 8 being members of the rigid outer frame of the machine.

Figure 2:
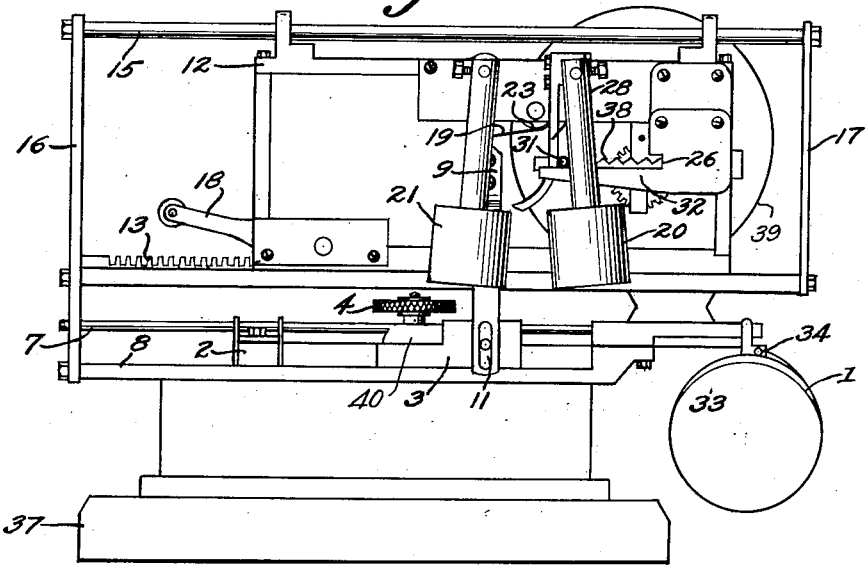
Figure 2 is a rear elevational view of the machine as a whole, which shows the pendulous lever-arms constituting essential parts of what may be designated the "sensitive element" of the force-transmitting system.

A lever system comprising an arm 9 and pivot-fulcrum 10 is connected at its lower end to the sliding member 3 by means of a pin-and-slot pivot 11. The lever arm 9 is supported by, and pivoted on, a movable inner-frame member designated 12, which may be caused to move horizontally to the right or left (Figures 1, 2, 3) by means of a rack-and-pinion system 13 and 14. A lug-stop, 30, projecting from a plate attached to the inner-frame 12, serves to prevent the lever-arm 9, from turning in a counter-clockwise direction, beyond the vertical position (Figures 1 and 3), thus serving to return clamp block 3 to its initial position when the inner-frame member 12 is moved back (to the left) after a test. When moved, the inner-frame slides along a guide-rod 15 which, with suitable supports 16 and 17, constitutes part of the outer frame-work of the machine which is supported by the base 37. The rack 13, has the form of a fixed cog-track, forms part of a rigid longitudinal member of the outer-frame, and also serves as a guide for the inner-frame. The rotation of pinion 14, and thereby the movement of the inner-frame member 12, is controlled by a shaft and crank, designated 18, suitably supported on the inner-frame. The upper end of the lever-arm 9 is connected by means of two attached flexible, preferably steel) bands 19 to each of the two members of the "sensitive element" of the force-transmitting system, aforementioned. The sensitive element, including parts 9, 19, 20, 21 and 22, is supported by, and on, the movable inner-frame 12. The sensitive element comprises a twin, dead-weight loading device, essentially consisting of two pendulous, weighted lever arms, 20 and 21, each capable of being swung upward in a short arc, in a vertical plane paralleling the plane of the inner-frame 12, and each fitted with a circular drum 22, rigidly attached to the upper end of its lever arm and concentric with the pivot-shaft on which it is suspended. Each of the two flexible bands 19, which are attached to the upper end of the lever arm 9, passes under an idle pulley 23, and thence over and around one of the drums 22, the end of each band being fastened to the respective drum in such a position that the drum may be rotated by tension on the band, to swing its weighted arm, or pendulum, through an arc not exceeding 90 degrees, from the perpendicular position.

The arrangement of the aforementioned parts, and others such as suitable support-and-bearing members, not specifically mentioned, is such that the application of force tending to move the inner-frame assembly 12 to the left, (Fig. 2), will directly exert a pull toward the left, or tension on the flexible band 1; and when a specimen of fruit has previously been placed in the loop of band 1 and encircled thereby, band 1 then having been drawn taut by adjustment of member 2 and firmly clamped to member 3,—the tension or force exerted on band 1 will be opposed by resistance of the fruit to compression, and this force will be transmitted through the lever 9, tending to rotate it counter-clockwise, and causing a corresponding tension on bands 19. This tension on the flexible bands 19 will tend to rotate the drums 22 and cause the weighted arms or pendulums 20 and 21 to describe diverging arcs, thus raising the weights arc-wise until the sum of the moments of force about pivot-fulcrum 10 exerted by the two raised pendulums just equals the moment of force exerted by the tension on flexible band 1. Further, the tension band 1 may be viewed as being due to a draw-back force arising from the surface pressure exerted by the compressed fruit against the encircling band 1.

The magnitude of the force exerted by the raised pendulums is dependent on their degree of divergence and is empirically measured, in the herein illustrated form of this invention, by the rotation of an indicator-hand 24 traversing a suitably graduated dial 25. The rotation of the said indicator-hand is actuated by a rack-and-pinion system 26, 27, 29, of which the rack-member 26 is movable horizontally to right or left (Fig. 2), along a slideway on shelf 32,—rack-member 26 being fitted with a roller 31, which aids in supporting one end of said rack 26 on the slideway. Rack-member 26 is actuated by a curved cam-lever, 28, in contact with roller 31, the said roller 31 functioning also as a cam-follower. The cam-lever 28 is rigidly attached to the upper end of the weighted arm, or pendulum 20, and is so shaped and arranged that any divergent motion of the pendulums 20 and 21 will cause a corresponding proportional displacement of rack-member 26 to the right (Fig. 2) and consequent deflection of the indicator-hand. On completion of a test, rack-member 26 is not drawn back (towards the left) by lowering of the pendulums, but it remains in the position to which it had been pushed by the cam-lever 28, thus retaining the indicator-hand in the position corresponding to the maximum elevation, or divergence, attained by the pendulums. The arrangement is shown more clearly in Figure 6. The rack-member 26 is also provided with notches or markings 38 (constituting a graduated scale along its upper edge) so spaced that each notch passing a mark or fixed point on the inner-frame 12 (such as, for example, the periphery of the dial-plate 39, Fig. 2) indicates one complete revolution of the indicator-hand; the hand being capable of ten revolutions in the particular machine now being described. It is to be understood, however, that I do not wish to be restricted to the employment of the above described assembly for measuring the force exerted by the raised pendulums,—which assembly as above described, comprises a dial and indicator-hand actuated by a rack-and-pinion system,—since any of several devices familiar to the art for measuring the degree of divergence or degree of elevation of the pendulums or of one of the pendulums would serve the purpose of the said assembly.

Novel features comprised by my invention include the following parts and devices (described above) and their combination and arrangement in the construction of an operable machine for fulfilling the aforestated objects of this invention:—A flexible metal band, including in its compass a contractible, circular loop or bight, for exerting pressure by constriction on a specimen of fruit; and a force-transmitting system, connected with the said band, and essentially including a "sensitive element", comprising a dead-weight loading device embracing one or more pendulous weighted lever-arms, which when raised pendulum-wise are capable of exerting a steady, non-fluctuating and accurately measurable force, and other elements and parts for measuring this force, and for converting it into tension on the said flexible band. Although I ordinarily prefer to have both the constricting and the connecting flexible bands of steel, notice is hereby published that it is not my intention that the material, of which the said bands are made, be restricted to steel; since under certain conditions, bands of brass or some other material might be employed to advantage.

Advantages of my invention are apparent, in that the machine is simple in construction; has few parts, and they of such nature as not readily to become out of order; and does not depend for the transmission or balancing of applied force, on a device whose force-transmitting mechanism is inherently subject to change and deterioration,—but rather depends on a dead-weight loading device capable of applying the constant force of gravity, for these purposes.

As an example of the operation of a machine embodying the herein disclosed invention:—

A specimen of the fruit to be tested is placed in the loop of the flexible band 1, and the block 2 is moved to the right (Figures 1 or 3) until band 1 becomes taut and its loop with the guard, 33, completely and closely encircles the fruit equatorially. Band 1 is then securely clamped to the block-member 3 by tightening the clamp-jaw 40 by means of clamp-screw 4, and the circumference of the fruit is read off of the graduated scale 5, from the position of the pointer attached to block 2. The position on the scale, of the pointer on block 3, is also determined and both readings recorded. At this point, also, the position of the indicator-hand on the dial is recorded and the zero-reading for force applied to the fruit. The handle of crank 18 is now slowly turned clockwise by the operator, with the result that force is applied moving, or tending to move, inner-frame 12 to the right, and the loop of band 1 is constricted, compressing the fruit. As the force moving inner-frame 12 to the right is increased, the tension is increased on both the constricting and the connecting bands 1 and 19, and the pendulums 20 and 21 are spread apart, the weighted ends rising in diverging arcs, and providing a force balancing the tension on band 1, commensurate with the pressure on the fruit. The magnitude of this force is indicated by the degree of rotation of the indicator-hand 24. The force exerted on the crank and resulting pressure on the fruit is increased until disruption of the fruit occurs; at which point the magnitude of the force—as registered by the number of revolutions of the indicator-hand, and its position on the dial,—is read and recorded; and also the decrease in circumference (and from this the final circumference) of the compressed fruit is determined from the position on the scale of the pointer on block 3.

The final circumference and the width of the band 1, being known, and a calibration of the apparatus in terms of pounds tension on band 1 having been made, it is possible by the following equation to calculate the pressure in pounds per square inch that was required to disrupt the fruit under examination:

$$P = \frac{(dR \times F) + I}{C \times W}$$

in which $P$=pressure in pounds per square inch;
$dR$=dial reading;
$F$=a factor determined by actual calibration of the dial indicator in terms of pounds of tension on the band;
$I$=initial tension correction in pounds, corresponding to the zero-reading of the indicator-hand, (and covering friction, inertia, etc.), also determined in the actual calibration of the dial-indicator;
$C$=final circumference of fruit in inches;
$W$=width of band 1, in inches.

Calibration of the dial-indicator assembly in terms of tension (in pounds) applied to the flexible band, 1, is readily accomplished through the expedient of detaching the loop end of flexible band 1 from the rigid outer frame, permitting the thus freed end of the band to hang downward, thus doing away with the loop, suspending suitable known weights from this free end of the band and operating the machine to raise the known weights.

In the case of one particular machine of the form herein described, the factor ($F$) was found to have an average value of 10.24; the initial correction ($I$) was found by an extrapolation of calibration data to approximate 9.5; and since $W$ equaled 0.32,—the equation for this particular machine became $$P = \frac{32 dR + 29.69}{C}$$

For practical working conditions, however, the value of $(dR \times F) + I$, representing the total tension on band 1, could probably be more conveniently and accurately ascertained through the construction and use of a graph representing the relationships between known actual tensions on the band, and corresponding readings on the dial-indicator.

With the particular machine described above, the circumference of the fruit can be read to one-sixteenth of an inch, and the number of revolutions of the indicator-hand around the dial to the fourth decimal place.

It is to be understood that changes in the shape, size and arrangement of parts of the machine may be resorted to without departing from the spirit of the invention, or the scope of the subjoined claims.

Having described my invention, I claim:

1. A testing machine for applying external pressure to a specimen of fruit, for accurately measuring the pressure applied and for accurately measuring the circumference of the fruit, which comprises a base, a rigid outer frame mounted on said base, a flexible band one end of which is formed into a contractible circular loop and rigidly attached at the loop end of the band to the outer frame, a sliding adjustment block mounted on said outer frame and to which is attached the other end of said band, a sliding clamp block member mounted on the outer frame between the loop and the sliding adjustment block and through which the straight portion of the flexible band passes, an upright arm attached to said sliding clamp block member, a movable inner frame supported by the outer frame and pivotally attached to the upright arm, a rack, pinion and crank assembly in which the pinion-gear is actuated by the crank mounted on the said inner-frame and is associated with the rack rigidly attached to the fixed outer frame whereby the inner-frame may be moved horizontally either way with reference to the fixed outer frame to contract or expand the loop, means to measure the changing diameter of the loop and means to measure the force applied to the rack, pinion and crank assembly in contracting said loop.

2. A testing machine for applying external pressure to a specimen of fruit, for accurately measuring the pressure applied and for accurately measuring the circumference of the fruit, which comprises a base, a rigid outer frame supported by said base, a flexible constricting band one end of which is formed into a contractible circular loop and attached at the loop end of the band to the outer frame, a movable inner-frame supported by said outer frame, a force-transmitting system associated with the movable inner-frame and including a sensitive element supported on said inner-frame and connected with the said constricting band by means of a lever-system pivoted on the inner-frame, the said sensitive element comprising two weighted lever-arms pendent from the said inner-frame and provided with rotation-actuating drums affixed one to each weighted lever-arm at its upper end concentric with its pivot-shaft, the said drums being connected by a flexible band or wrapping-connector attached to each drum, to the aforementioned lever-system pivoted on the movable inner-frame, a further part of the force-transmitting system including a crank-actuated pinion mounted on the movable inner-frame and associated with a fixed rack fastened to the rigid outer frame, an indicating device associated with the aforementioned sensitive element and arranged so as to indicate accurately the degree of rotation of the weighted lever arms, and thereby accurately to measure the tension exerted on the aforesaid constricting band, sliding block members provided with pointers associated with graduated scales and attached to the aforementioned constricting band, substantially as described.

3. A testing machine for applying external pressure to a specimen of fruit, for accurately measuring the pressure applied and for accurately measuring the circumference of the fruit, which comprises a base, a rigid outer frame supported by said base, a flexible constricting band one end of which is formed into a contractible circular loop and attached at the loop end of the band to the outer frame, a movable inner-frame supported by said outer frame, a force-transmitting system associated with the movable inner-frame and including a sensitive element supported on said inner-frame and connected with the said constricting band by means of a lever-system pivoted on the inner-frame, the said sensitive element comprising a weighted lever-arm pendent from the said inner-frame and provided with a rotation-actuating drum affixed to the weighted lever-arm at its upper end concentric with its pivot-shaft, the said drum being connected by a flexible band or wrapping-connector attached to the drum, to the aforementioned lever-system pivoted on the movable inner-frame, a further part of the force-transmitting system including a crank-actuated pinion mounted on the movable inner-frame and associated with a fixed rack fastened to the rigid outer frame, an indicating device associated with the aforementioned sensitive element and arranged so as to indicate accurately the degree of rotation of the weighted lever arm, and thereby accurately to measure the tension exerted on the aforesaid constricting band, sliding block members provided with pointers associated with graduated scales and attached to the aforementioned constricting band, substantially as described.

4. A testing machine for applying external pressure to a specimen of fruit, for accurately measuring the pressure applied and for accurately measuring the circumference of the fruit, which comprises a base, a rigid outer frame supported by said base, and having a lug at one end, a carrier-pulley secured to the lug, a flexible metal band having one end fastened to the outer frame near the lug, the band extending thence to form a contractible circular loop, a curved guard at the top of the loop to serve as a guide for the band and aid in distributing compressive force applied to the fruit, the band passing over the carrier-pulley and extending horizontally along the outer frame, a sliding adjustment block provided with a pointer mounted on said outer frame and to which is attached the other end of said flexible band, a sliding clamp block having a pointer and mounted on the outer frame between the loop and the sliding adjustment block, and through which said band passes, a movable inner-frame supported by the outer frame, a lever-arm pivoted on the inner-frame, a pin and slot pivot connecting the lever arm at its lower end to the sliding clamp block, two flexible metal bands attached to the upper end of said lever-arm, two weighted lever-arms hung pendulum-wise from the inner-frame and having drums at their upper ends, the flexible metal bands arranged to function as wrapping-connectors to the drums, pivot-shafts concentric with the drums supporting the weighted arms, the arrangement being such that tension on the band wrapping-connectors will tend to rotate the drums and cause the weighted arms to diverge arc-wise, a shaft connected crank and pinion-gear mounted on the inner-frame, and forming parts of a rack-and-pinion system for applying force tending to move the said inner-frame with respect to the fixed outer frame in a direction tending to exert tension on the band wrapping-connectors and on the contractible flexible band, a curved cam-lever affixed to one of the aforementioned weighted lever-arms, a second rack-and-pinion system in which the rack is movable and a cam follower attached to this movable rack associated with the said curved cam-lever, a graduated dial having an indicator hand, mounted on the inner frame and pinion means connecting the indicator hand and the movable rack, this said rack-and-pinion system actuating and controlling the rotation of the indicator-hand associated with the graduated dial, these several members being supported on the movable inner-frame and so arranged that any motion of divergence from the vertical, of the aforesaid weighted lever-arm, is translated into rotary motion of the indicator-hand, the movable rack-member being provided with notches for indicating by their position relative to a fixed index point on the inner frame the number of revolutions described by the indicator-hand, an idle pulley for guiding the band wrapping connectors and guides, guide rods and slideways associated with said sliding members, substantially as described.

5. A testing machine for applying external pressure to a specimen of fruit, for accurately measuring the pressure applied and for accurately measuring the circumference of the fruit, which comprises a base, a rigid outer frame mounted on said base, a flexible constricting band fashioned near one end into a contractible circular loop and fastened at this said end to the outer frame, a movable inner frame supported on said outer frame and connected with the other end of said flexible band, means to connect said other end of the flexible band to the movable inner frame and in part carried thereon, a pivoted pendulous sensitive element supported on the inner frame and connected with said constricting band through said connecting means, the said connecting means being adapted to cause motion of the inner frame with reference to the outer frame to exert tension on the said flexible constricting band and for translating the said motion into a corresponding and counterbalancing deflection of the said sensitive element, force transmitting means associated with said inner frame whereby the inner frame may be moved in a manner to contract said loop, means for measuring the change in diameter of the loop and means associated with the aforementioned sensitive element for indicating the force exerted in contracting the loop.

AUSKER E. HUGHES.